No. 12,349. REISSUED MAY 23, 1905.

R. D. TOMLINSON.

CONDENSER.

APPLICATION FILED NOV. 29, 1904.

4 SHEETS—SHEET 1.

WITNESSES:

Jno. V. Brown

Harry C. Ord

R. D. Tomlinson INVENTOR

BY G. F. DeWitt

ATTORNEY.

No. 12,349. REISSUED MAY 23, 1905.
R. D. TOMLINSON.
CONDENSER.
APPLICATION FILED NOV. 29, 1904.
4 SHEETS—SHEET 2.
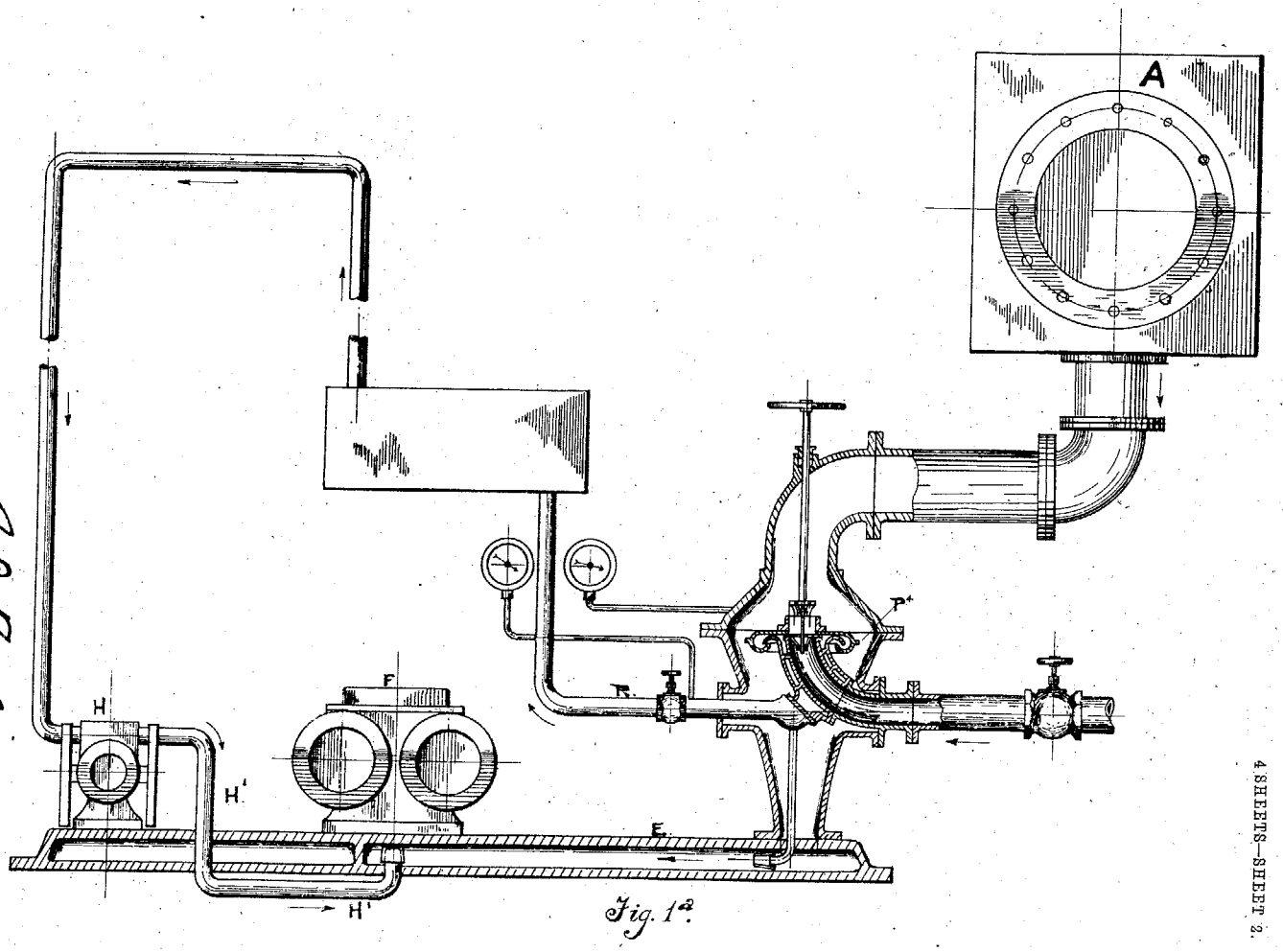
WITNESSES:
Jno. W. Brown
Harry C. Ord
R. D. Tomlinson INVENTOR
BY G. F. DeWein
ATTORNEY.

No. 12,349. REISSUED MAY 23, 1905.

R. D. TOMLINSON.

CONDENSER.

APPLICATION FILED NOV. 29, 1904.

4 SHEETS—SHEET 3.

WITNESSES:
Oscar Brossman
Max Rotter

R.D. TOMLINSON
INVENTOR
BY G. F. DeWein
ATTORNEY.

No. 12,349.

REISSUED MAY 23, 1905.

R. D. TOMLINSON.

CONDENSER.

APPLICATION FILED NOV. 29, 1904.

4 SHEETS—SHEET 4.

WITNESSES:

Jas. W. Brown

Harry C. Ord

R. D. Tomlinson INVENTOR

BY G. F. DeWein

ATTORNEY.

No. 12,349. Reissued May 23, 1905.

UNITED STATES PATENT OFFICE.

ROYAL D. TOMLINSON, OF NEW YORK, N. Y.

CONDENSER.

SPECIFICATION forming part of Reissued Letters Patent No. 12,349, dated May 23, 1905.

Original No. 724,972, dated April 7, 1903. Application for reissue filed November 29, 1904. Serial No. 234,815.

*To all whom it may concern:*

Be it known that I, ROYAL D. TOMLINSON, a citizen of the United States, residing at New York, State of New York, have invented Improvements in Condensers, of which the following is a specification.

The improvement applies to that class in which there is a special passage leading to a second air-pump for abstracting the air and preventing it from accumulating in the upper portion of the condenser, thus contributing to the completeness of the vacuum. Such air, mingled with weak steam, has been before taken away by a separate air-pump. I have discovered that the second air-pump may be dispensed with and the small quantity of air in an attenuated condition which has been brought in with the steam and with the water of condensation or even the sometimes larger quantities which may come in through small leaks in the apparatus may be more effectually taken away and mingled with the water going into an ordinary single air-pump by a simple addition to the long-approved construction. I provide by a small jet of live steam properly directed into such passage for maintaining a slightly-stronger eduction therein.

The following is a description of what I consider the best means of carrying out the invention.

The accompanying drawings form a part of this specification.

Figure 1:
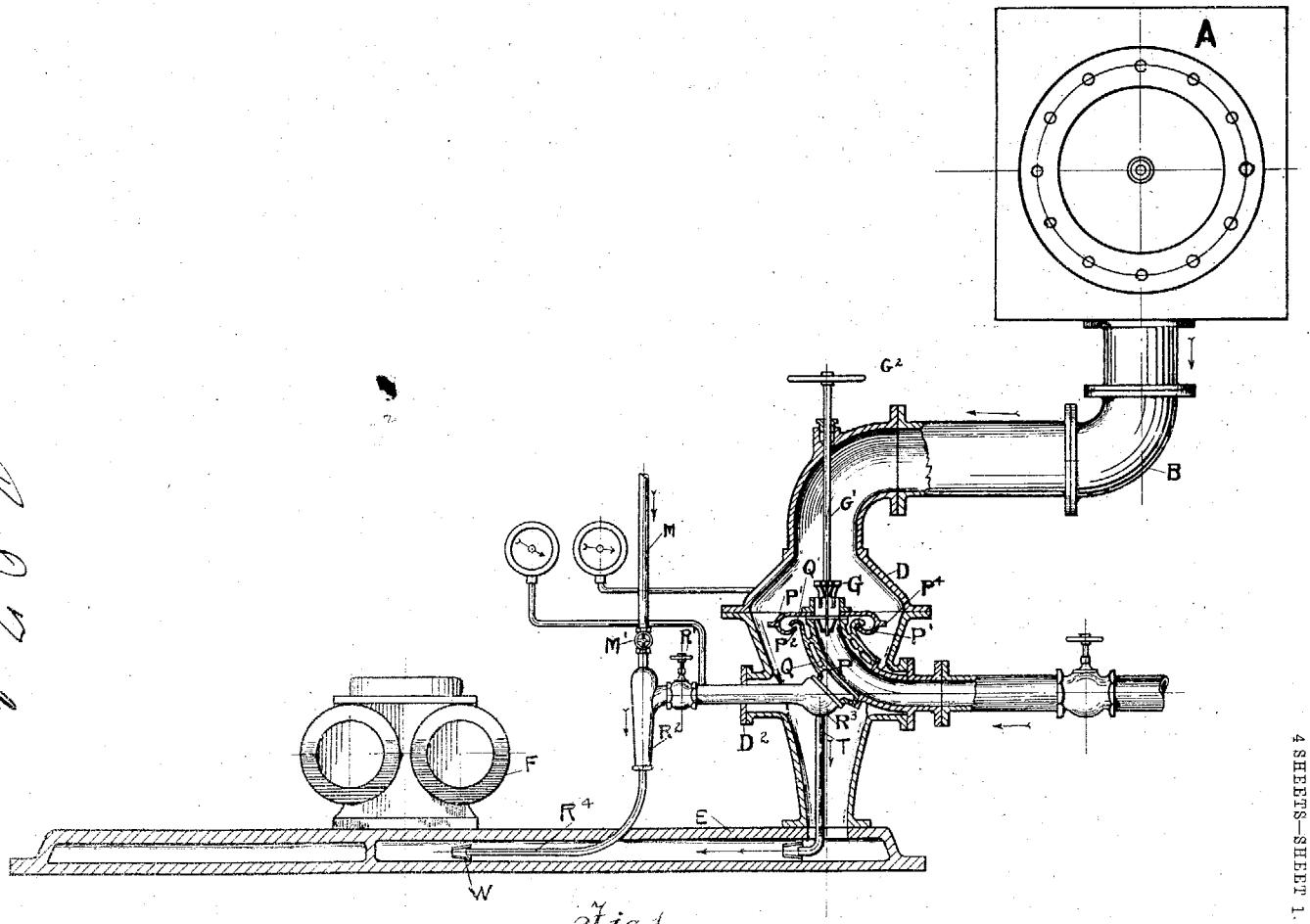
Figure 1B:
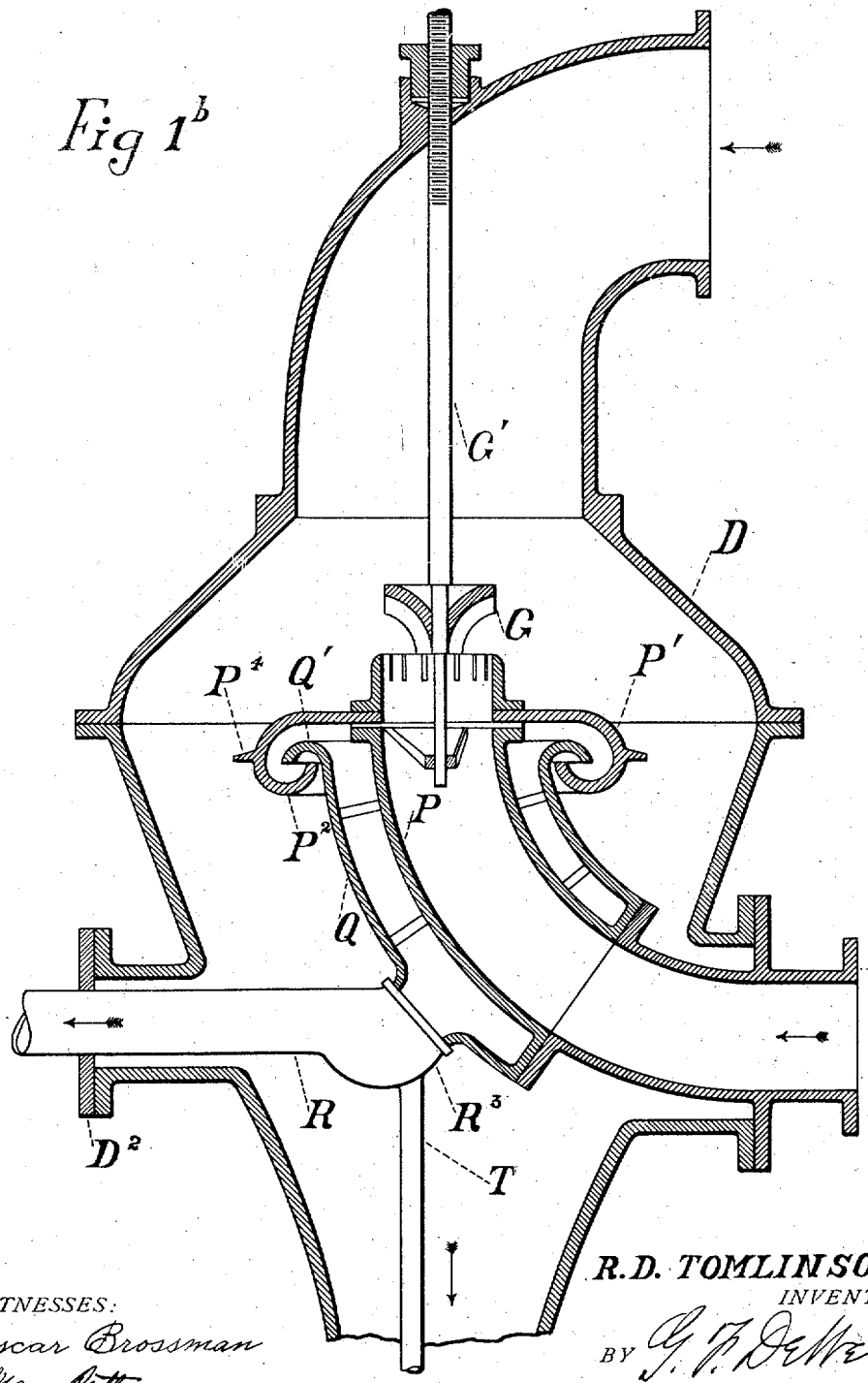
Figure 3:
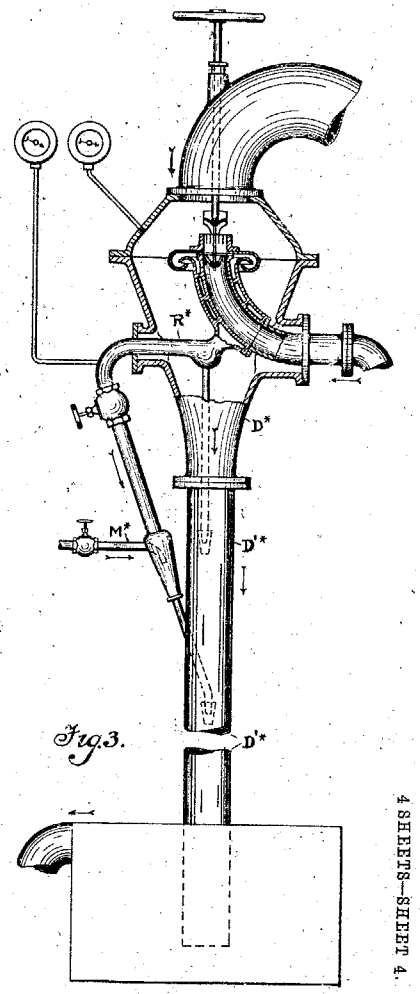
Figure 4:
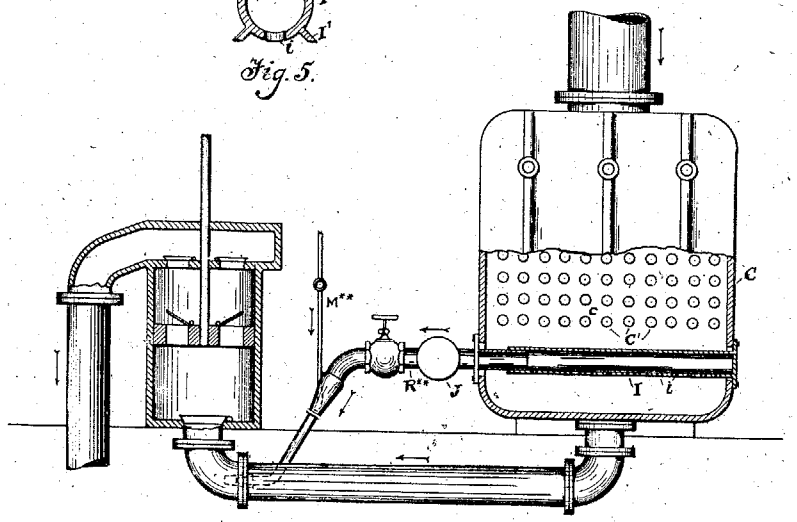
Figure 2:
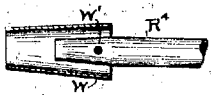
Figure 5:
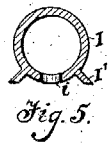

Figure 1 is a central vertical section of the condenser and its immediate attachments. Fig. $1^a$ is a corresponding view showing a modification. Fig. $1^b$ is an enlarged vertical section of the modification shown in Fig. $1^a$, but showing more clearly the slight lip on the curled rim of the flange on the water-inlet pipe. Fig. 2 is a longitudinal section of one of the details on a larger scale. Fig. 3 is a corresponding section showing a modification. Fig. 4 is a section showing the invention applied to a surface condenser. Fig. 5 is a cross-section of a portion shown in Fig. 4 on a larger scale.

Similar letters of reference indicate corresponding parts in all the figures where they appear.

Referring to Fig. 1, A is the engine, B the exhaust-pipe, and D the condenser. E is a liberal passage leading from the bottom of the condenser, and F is an air-pump, shown as a duplex Worthington. This air-pump, in addition to its usual function of taking out from the bottom of the condenser all of the water with some of the thin steam and air, also serves to remove a quantity of thin air taken from a high point in the condenser where the air is liable to accumulate. The air-pump should in theory be a little larger than is required for ordinary condensers; but my experiments indicate that the increase in size required to serve successfully with my invention is so slight as to be insignificant. The ordinary proportions may obtain. The condenser is of the jet class, flowing water as cold as can be commanded into the condenser and bringing it into direct contact with the exhaust-steam. G is a spreader operated by means of a stem G′ and hand-wheel $G^2$, which stands in the path of the strong jet received through the pipe P. The upper end of the latter pipe is flanged outward, as indicated by P′. Its rim is curled downward, inward, and upward underneath, as indicated by $P^2$. Its upper surface is ridged radially, and around the largest diameter is a slight lip $P^1$. Q is an outer shell inclosing the pipe P and curved to correspond therewith. The upper end of this pipe Q is extended, as indicated by Q′. The construction thus shown forms a pocket in which water will rarely, if ever, enter. R is a small pipe connected to a low point in the large pipe or shell Q and extending out through the tight-fitting nozzle $D^2$ in the condenser. This pipe is controlled by a valve R′, after passing which it is deflected downward, as indicated by $R^2$. It is entered at an angle by a small pipe M, bringing live steam from the boiler (not shown) and controlled by a valve M′. The inner end of this pipe M is properly formed to act upon the attenuated contents of the pipe R and impel them with force. This pipe R, having its contained air and steam thus conditioned moving rapidly through it, extending downward, enters the horizontal passage E and extends along therein. It terminates in the immediate vicinity of the air-pump F with a peculiar nozzle W, which I will describe more minutely farther on. This pipe R draws out the contents of the annular curved space between the pipes P and Q and maintains or seeks to maintain a slightly-better vacuum in such space than obtains in the main body of the condenser. It prevents any accumulation of air in such space. $R^3$ is a depression adapted to receive and retain any water which may by any chance get into the annular space between the pipes P and Q. A pipe T extends downward from the bottom of this depression within the base of the condenser and is bent and extends along a little in the passage E. The end of this pipe T is also equipped with one of my peculiar nozzles. In the absence of any water this pipe T can, in common with the pipe R, deliver air and thin steam downward; but its action will differ from that of the pipe R in the fact that there is in T no jet of fresh steam to quicken the motion of its contents.

I will now describe minutely the nozzle W. There is a liability to concussive action when a steam-pipe is allowed to discharge under water. I ascribe this to the freedom for the approach and retreat of the water in an ordinary open vessel and the consequent intermittent condensation in its mouth. In my apparatus it will sometimes, though rarely, be the fact that the thin fluid which is delivered through one or both of the pipes R and T into the water flowing through E will be so largely steam that such concussive action may occur. I provide against this by a provision attached to the end of each pipe R and T, and also to the end of another which I will describe farther on in connection with a modification. I will show one example of such nozzle on a larger scale.

Referring to Fig. 2, $R^4$ is the end of the pipe R proper, slightly tapered, as shown, and W is an inclosing tube correspondingly tapered, but of larger diameter and extending considerably beyond. It is held in position by thin radial arms W′. The effect is to so regulate and direct the access of water to the issuing current of air and steam that the mingling and condensation are certain to be smoothly continuous without any appreciable concussion.

It will be observed that the concentric pipe or casing Q, inclosing the injection-pipe P, constitutes, in effect, a pipe (a passage) leading from a high point in the condenser down to the junction of the pipe R, which takes out the air. In that point of view the air in the forms shown in Figs. 1, $1^a$, $1^b$, 3, and 4 is taken from a high point in the condenser. In all the forms the passage connects to a dry point in the condenser, one in which the air would otherwise accumulate.

Modifications may be made without departing from the principle or sacrificing the advantages of the invention. The forms and proportions of the parts may be varied. I attach importance to the conoidal form of the top of the condenser, as shown in Figs. 1 and 3, because it provides sufficiently for the spreading of the injection-water and reduces the possibility of pocketing any air there.

Parts of the invention may be used without others.

Fig. 3 shows a pipe corresponding to the pipe T, extending downward only a little way, but so far as to be certain to be immersed in the descending current of water. This figure also shows the pipe R*, corresponding to R, inclined in the opposite direction to that in Fig. 1 and leading into an extended descending portion D′* of the condenser. These modified pipes are shown as equipped with my nozzle for avoiding concussions. The pipe M*, giving the live-steam jet in this Fig. 3, enters the pipe D′* and serves substantially in the same manner as before described. The vertical descent from the condenser may be increased to any required extent. This figure shows it as broken off and its lower end brought up to shorten the figure. If the situation allows the extension down to a sufficient depth, the delivery of the water will by my invention thus arranged be accomplished without an air-pump. In short, this figure shows my invention applied to what is often designated a "barometric" tube-condenser.

Fig. 4 shows the invention applied to a surface condenser. C is the body of the condenser; C′, the tubes therein conducting water through the steam-space *c*, the discharge from the bottom of the condenser corresponding to the passage E in Fig. 1. R is a pipe corresponding to R in Fig. 1, discharging in a similar manner into the current of water flowing to the air-pump, and M is a live-steam pipe corresponding to the pipe M in Fig. 1. In this form I indicates a series of horizontal pipes liberally perforated along their under sides and shielded from water by wings I′. The air is drawn into the pipes I through the perforations *i* and gathered in the header J and led away through the pipe R**. I can use the jet of live steam for inducing or tending to induce a higher vacuum in the air-space in the condenser, or I can use a second air-pump H, sometimes known as a "dry" vacuum-pump, for the same purpose. I can introduce the delivery of the second (the dry) vacuum-pump H into the suction-chamber of the wet-air pump F, thereby reducing the work required of the dry vacuum-pump by reason of the decreased pressure that it must work against. The left side of Fig. $1^a$ shows a construction in which this latter point is involved. In this figure the descending pipe $R^2$ is omitted and the thin air drawn from the condenser through the pipe R instead of being acted on by a live-steam jet and receiving an impulse therefrom is led upward, and any water or oil which it may contain may be separated in a chamber, as shown. The thin gaseous matter is then led upward to a height to which the atmospheric pressure cannot sustain the water, so that no water is liable to pass to the dry vacuum-pump H, thereby damaging it. The air is then led to such pump and the delivery therefrom is shown as led downward by the pipe H′ to a low level and thence horizontally under the water-passage and upward into the suction-chamber of the wet-air pump. The direction of the current in the various parts is indicated by arrows.

I claim as my invention—

1. In a condenser having connections for separately discharging water and air, provisions for discharging the air into the stream of water being carried therefrom in a direction corresponding with the motion of the latter, and provisions for promoting the flow of the air through such passage, all combined substantially as herein specified.

2. In a condenser having connections for separately discharging water and air, provisions for delivering through such air-passage into the water-passage so that such delivery is subject to vacuum, in combination with means for further promoting the flow of the air through the air-passage, all substantially as herein specified.

3. In a jet-condenser, a steam-inlet at the top, a water-injection pipe at a lower level and means continuous with the pipe-surface for guiding the water outward to form a gravity-seal.

4. In a jet-condenser, a steam-inlet at the top, a water-injection pipe at a lower point, an outwardly-extending flange at the upper end of the pipe, the rim of the flange being downwardly curled, and a substantially horizontal lip on the rim.

5. In a jet-condenser, a steam-inlet at the top, a water-injection pipe at a lower point, an outwardly-extending flange at the upper end of the pipe, the rim of the flange being downwardly curled, and a lip on the rim around the largest diameter.

6. In a jet-condenser, a steam-inlet at the top, a water-injection pipe at a lower level, means continuous with the pipe-surface for guiding the water outward to form a gravity-seal, and means for removing the air below the seal.

7. In a jet-condenser, a steam-inlet at the top, a water-injection pipe at a lower point, an outwardly and then downwardly extending flanged portion at the upper end of the pipe, a substantially horizontal lip on the flanged portion, and means for removing air from below the flanged portion.

8. In a jet-condenser, a steam-inlet at the top, a water-injection pipe at a lower point, an outwardly-extending flange at the upper end of the pipe, the rim of the flange being downwardly curled, a substantially horizontal lip on the rim, and means for removing air from below the flange.

9. In a jet-condenser, a steam-inlet at the top, a water-injection pipe at a lower point, an outwardly-extending flange at the upper end of the pipe, the rim of the flange being downwardly curled, a lip on the rim around the largest diameter, and means for removing air from below the flange.

10. In a condenser having connections for separately discharging water and air, a dry-air pump in the air-discharge passage and connections for delivering from such air-passage into the water-passage so that such delivery is subject to vacuum.

11. In a condenser having connections for separately discharging water and air, a dry-air pump in the air-discharge passage and connections for delivering from such dry-air pump into the water-passage so that such delivery is subject to vacuum.

In testimony that I claim the invention above set forth I affix my signature in presence of two witnesses.

ROYAL D. TOMLINSON.

Witnesses:
GEORGE BAÉZ,
WM. V. TAAFFE.